US008838915B2

(12) United States Patent  
Samih et al.

(10) Patent No.: US 8,838,915 B2  
(45) Date of Patent: Sep. 16, 2014

(54) CACHE COLLABORATION IN TILED PROCESSOR SYSTEMS

(75) Inventors: Ahmad Samih, Beaverton, OR (US); Ren Wang, Portland, OR (US); Christian Maciocco, Portland, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 256 days.

(21) Appl. No.: 13/537,417

(22) Filed: Jun. 29, 2012

(65) Prior Publication Data

US 2014/0006713 A1     Jan. 2, 2014

(51) Int. Cl.
*G06F 12/00* (2006.01)
*G06F 12/08* (2006.01)
*G06F 13/00* (2006.01)
*G06F 13/28* (2006.01)

(52) U.S. Cl.
CPC .......... *G06F 12/0806* (2013.01); *G06F 12/084* (2013.01)
USPC ........... 711/156; 711/121; 711/130; 711/205; 711/206; 711/207; 711/221; 718/1

(58) Field of Classification Search
CPC .... G06F 12/0806; G06F 12/084; G06F 12/12
USPC ......... 711/121, 130, 156, 205, 206, 207, 221; 718/1

See application file for complete search history.

(56) References Cited

U.S. PATENT DOCUMENTS

| 5,937,431 | A  | * | 8/1999 | Kong et al. ................. 711/145 |
| 8,250,306 | B2 | * | 8/2012 | Larkby-Lahet et al. ...... 711/133 |
| 8,560,780 | B1 | * | 10/2013 | Agarwal et al. ............. 711/141 |
| 2007/0156963 | A1 | * | 7/2007 | Chen et al. .................. 711/130 |
| 2011/0145501 | A1 | * | 6/2011 | Steely et al. ................ 711/121 |
| 2013/0117521 | A1 | * | 5/2013 | Li et al. ...................... 711/170 |

* cited by examiner

*Primary Examiner* — Stephen Elmore  
*Assistant Examiner* — Mark Giardino, Jr.  
(74) *Attorney, Agent, or Firm* — Kenyon & Kenyon LLP

(57) ABSTRACT

The present invention may provide a computer system including a plurality of tiles divided into multiple virtual domains. Each tile may include a router to communicate with others of said tiles, a private cache to store data, and a spill table to record pointers for data evicted from the private cache to a remote host, wherein the remote host and the respective tile are provided in the same virtual domain. The spill tables may allow for faster retrieval of previously evicted data because the home registry does not need to be referenced if requested data is listed in the spill table. Therefore, embodiments of the present invention may provide a distance-aware cache collaboration architecture without incurring extraneous overhead expenses.

18 Claims, 8 Drawing Sheets

200

300

| DATA ID 310 | REMOTE HOST ADDRESS 320 |
|---|---|
| DATA | REMOTE HOST ID |
| LINE A | TILE 212 |
| LINE B | TILE 212 |
| LINE C | TILE 216 |
| LINE D | TILE 215 |
| LINE E | TILE 215 |
| LINE F | TILE 215 |
| LINE G | TILE 215 |

400

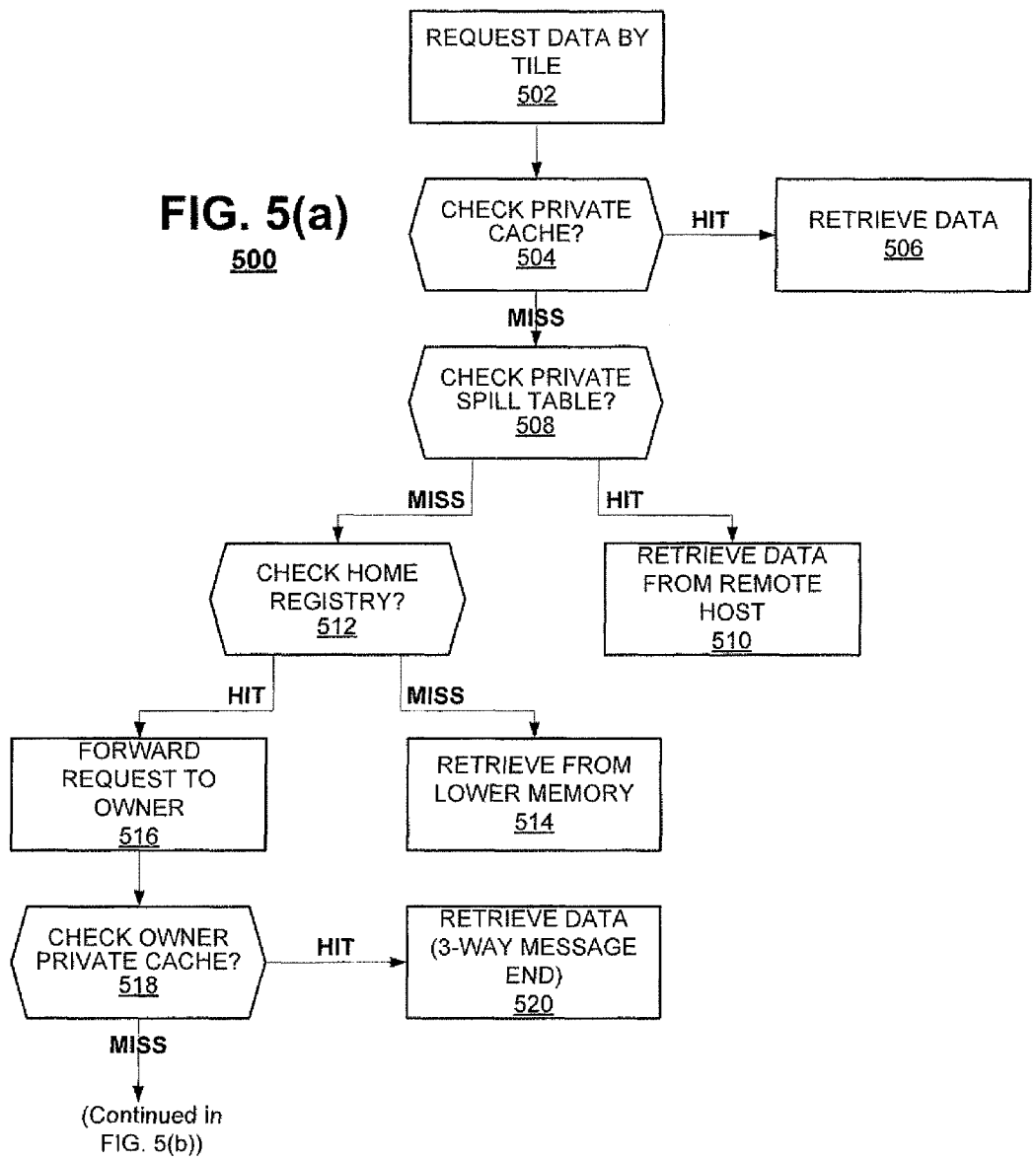

600

700

800

900

CACHE COLLABORATION IN TILED PROCESSOR SYSTEMS

FIELD OF THE INVENTION

The present disclosure relates to cache collaboration, in particular distance-aware collaboration architecture.

BACKGROUND

As technology trends towards scaling down components, the number of cores/nodes within a system (e.g., a chip) is increasing rapidly. This rapid growth, however, poses design challenges such as memory hierarchy organization and Network on Chip (NoC) floor planning.

For example, chip multi-processors (CMPs) with distributed caches suffer from a cache fragmentation problem, which is imbalanced cache utilization. In other words, some caches may be over-utilized while other caches may be under-utilized. To avoid cache fragmentation, some cache sharing and collaboration techniques have been proposed. Typically, a cache that has reached its maximum capacity, can evict (i.e., transfer) some of its data to a remote cache that has extra space rather than simply discarding the data. Oftentimes, however, the data is placed at a far-away node. Consequently, it is more "expensive" to retrieve the data from the remote cache than it would be to simply retrieve the data from lower level memory. As a result, cache retrieval from far-away nodes can have a significant impact on latency, interconnect traffic, and overall energy consumption.

Another proposed technique suggests placing the data at the evicted node's home node. However, having a per-block home node statically identified (e.g., hash functions, low-order bits physical address, etc.) can lead to high average NoC latency depending on the distance of the home node from the requested cache. Consequently, performance gain can be significantly reduced while interconnect energy consumption is increased.

Thus, the inventors recognized a need in the art for a distance-aware cache collaboration architecture without incurring extraneous overhead expenses.

DESCRIPTION OF THE FIGURES

FIGS. 5(a)-(b) illustrate a simplified process flow of a data retrieval process according to an embodiment of the present invention.

DETAILED DESCRIPTION

Figure 1:
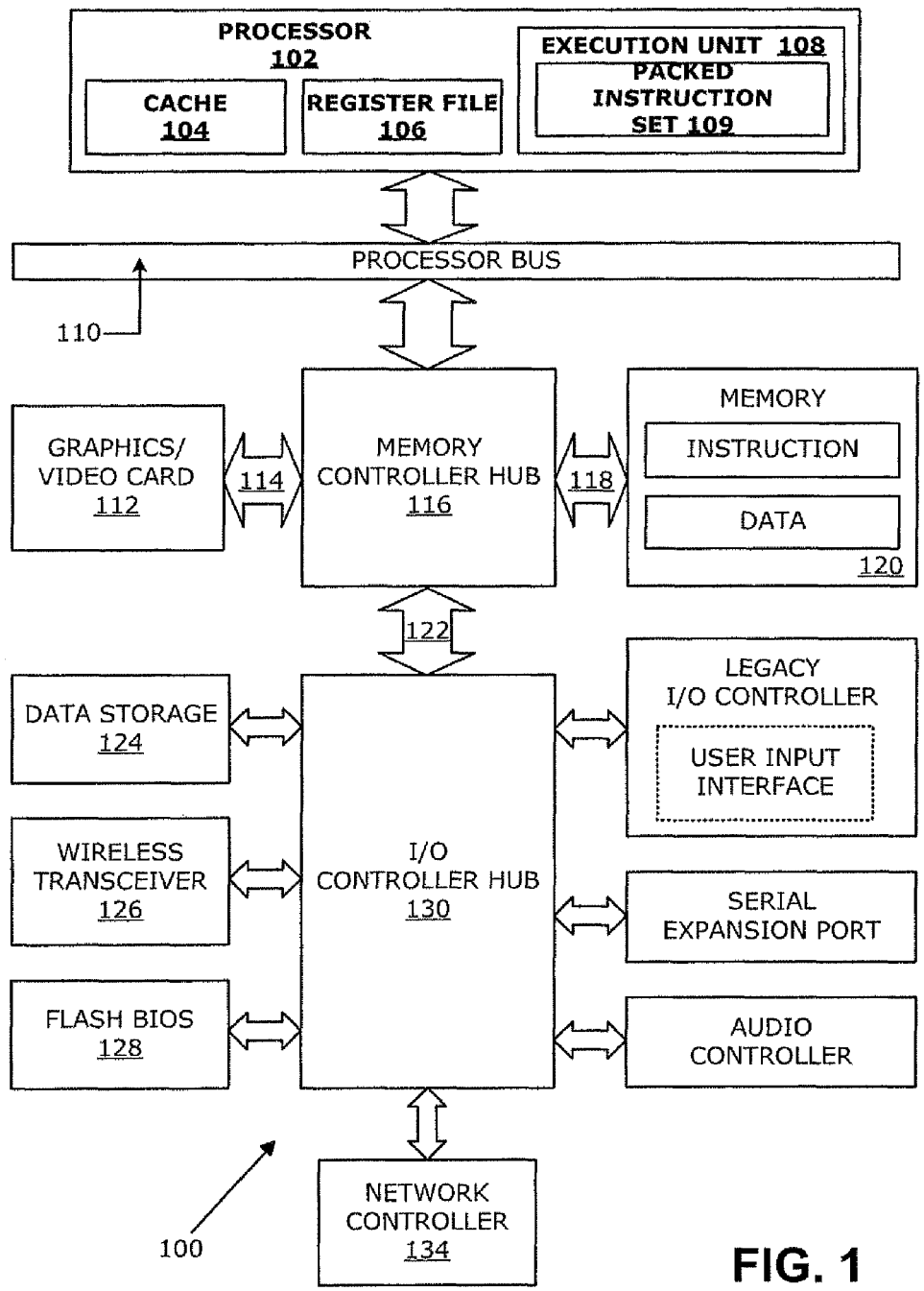
FIG. 1 illustrates a simplified block diagram of a system according to an embodiment of the present invention.

Embodiments of the present invention may provide a computer system including a plurality of tiles divided into multiple virtual domains. Each tile may include a router to communicate with others of said tiles, a private cache to store data, and a spill table to record pointers for data evicted from the private cache to a remote host, wherein the remote host and the respective tile are provided in the same virtual domain. The spill tables may allow for faster retrieval of previously evicted data because the home registry does not need to be referenced if requested data is listed in the spill table. Therefore, embodiments of the present invention may provide a distance-aware cache collaboration architecture without incurring extraneous overhead expenses.

In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in interne, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2A:
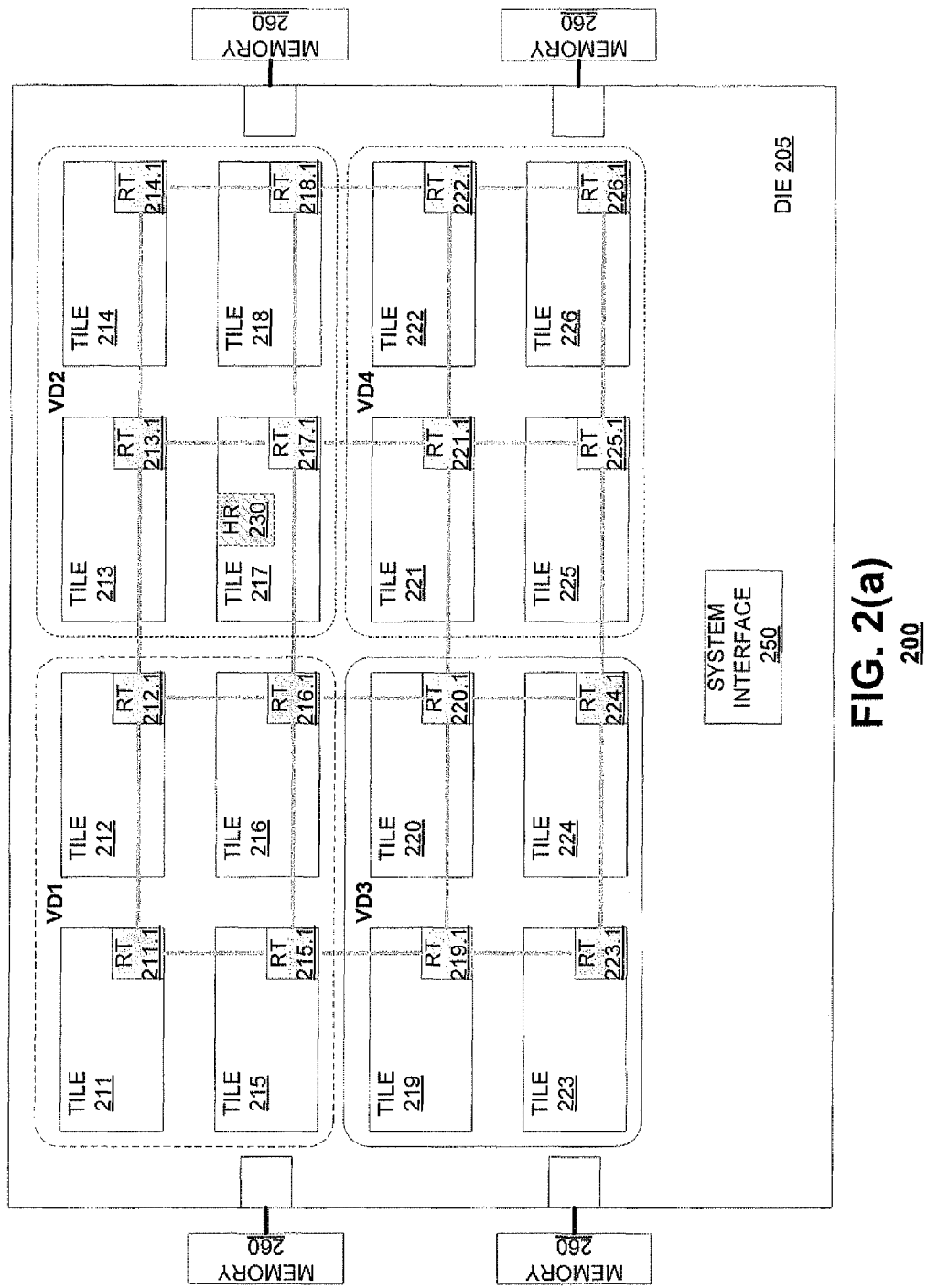
FIG. 2(a) illustrates a simplified block diagram of a system according to an embodiment of the present invention.

FIG. 2(a) illustrates a simplified block diagram of a system 200 according to an embodiment of the present invention. The system 200 may be provided as a chip multi-processor, for example a single chip computer (SCC). The system 200 may include a die 205, a plurality of tiles 211-226 with routers 211.1-226.1, a home registry 230, and a lower level memory 260.

The die 205 may be provided as a substrate, for example a silicon die. The tiles 211-226, system interface 250, and other components (not shown) may be fabricated and/or mounted on the die 205. Each tile 211-226 may be a core/node in the system 200. Although the system 200 shows sixteen tiles 211-226, the system 200 may be expanded to include any number of tiles (e.g., 48 tiles, 64 tiles, etc.). Further, the tiles 211-226 may be interconnected in a network. For example, the tiles 211-226 may be interconnected via a Mesh network as shown in FIG. 2(a). Alternatively, the tiles 211-226 may be arranged in a Torus, Ring, etc., network.

Each tile may include a router 211.1-226.1 to communicate with neighboring tiles. The tiles may also be configured to communicate with each other using other tiles as relays. For example, although tile 211 may not be directly coupled to tile 216, tile 211 may communicate with tile 216 via tile 212 or via tile 215. Hence, communication between the tiles 211-226 may suffer from non-uniform latency because the tiles are not equally distanced from each other.

The system interface 250 may provide an interface between the system 200 and other components (not shown). The lower level memory 260 may be coupled to the tiles 211-226, which may access the lower level memory 260. In an embodiment, the lower level memory 260 may be provided as a series of memory integrated circuits. For example, the lower level memory 260 may be provided as dual in-line memory module (DIMM).

The tiles 211-226 may be arranged in virtual domains (VD). In FIG. 2(a), the tiles may be divided into four VDs, VD1-VD4. VD1 may include tiles 211, 212, 215 and 216. VD2 may include tiles 213, 214, 217, and 218. VD3 may include tiles 219, 220, 223, and 224. VD4 may include tiles 221, 222, 225, and 226. In an embodiment, the tiles in each VD may collaborate with each other regarding cache uses. Although the system 200 shows four VDs with each VD including four tiles, the system 200 may be expanded to include any number of VDs with each VD including any number of tiles. The tiles 211-226 may also provide cache collaboration for each other. The home registry 230 may be provided in one tile (say, tile 217), and the home registry 230 may provide a list of data stored in every cache for cache collaboration.

Figure 2B:
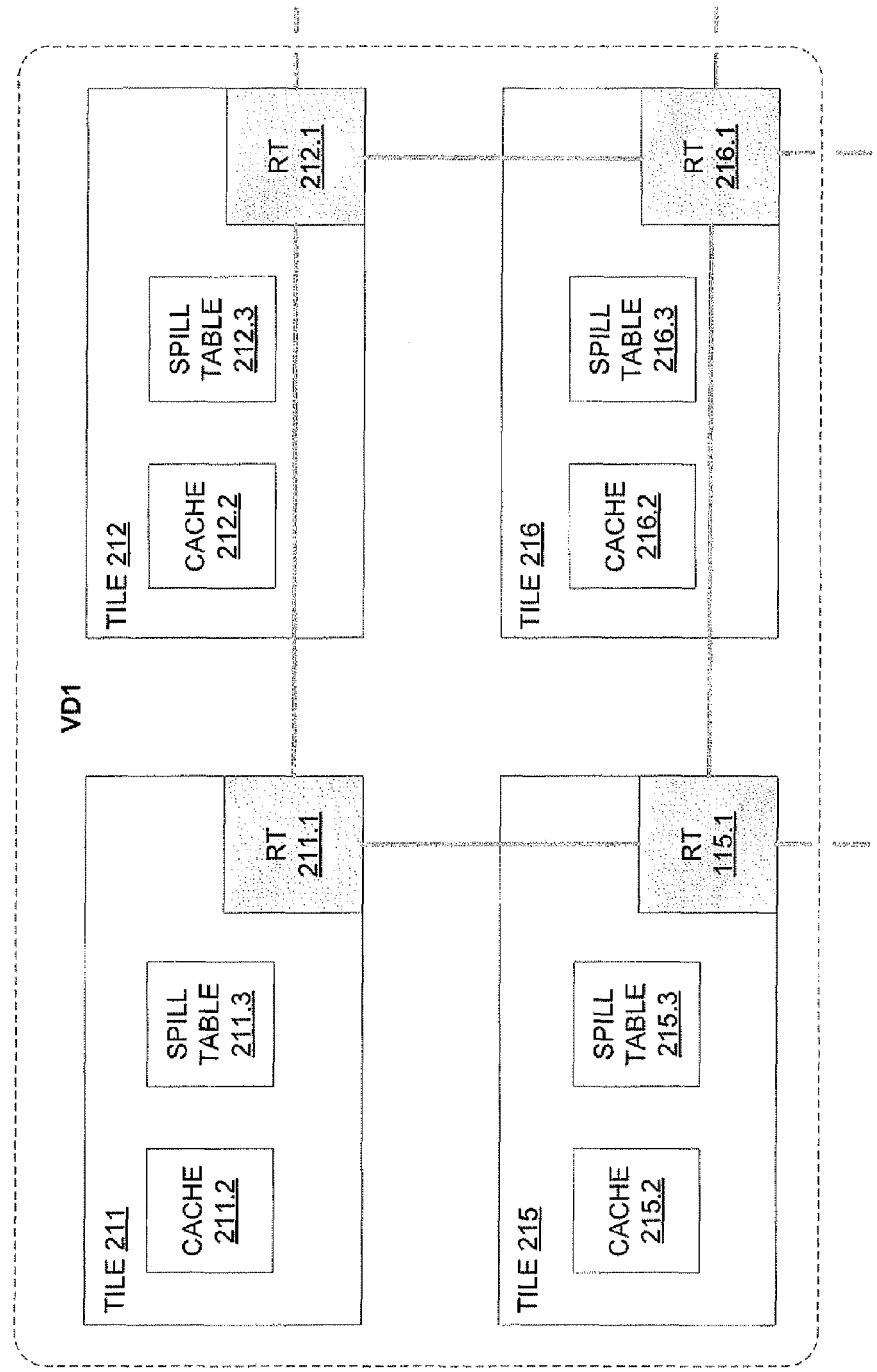
FIG. 2(b) illustrates a simplified block diagram of a system according to an embodiment of the present invention.

FIG. 2(b) illustrates a simplified block diagram of VD1 according to an embodiment of the present invention. In this embodiment, VD1 may include four tiles 211, 212, 215, and 216 arranged in a mesh network. The tiles may communicate with each other via their routers 211.1, 212.1, 215.1, and 216.1 that may be coupled via interconnects. Each tile may include a private (local) cache 211.2, 212.2, 215.2, and 216.2. The private caches 211.2, 212.2, 215.2, and 216.2 may be distinct separate caches or may be private slices of a larger shared cache. In an embodiment, the private caches 211.2, 212.2, 215.2, and 216.2 may be provided as L1 and/or L2 caches. Each tile may also include a spill table 211.3, 212.3, 215.3, and 216.4. In an embodiment, the spill tables 0.3, 212.3, 215.3, and 216.4 may be integrated with their respective private caches 211.2, 212.2, 215.2, and 216.2.

Figures 3, 4:
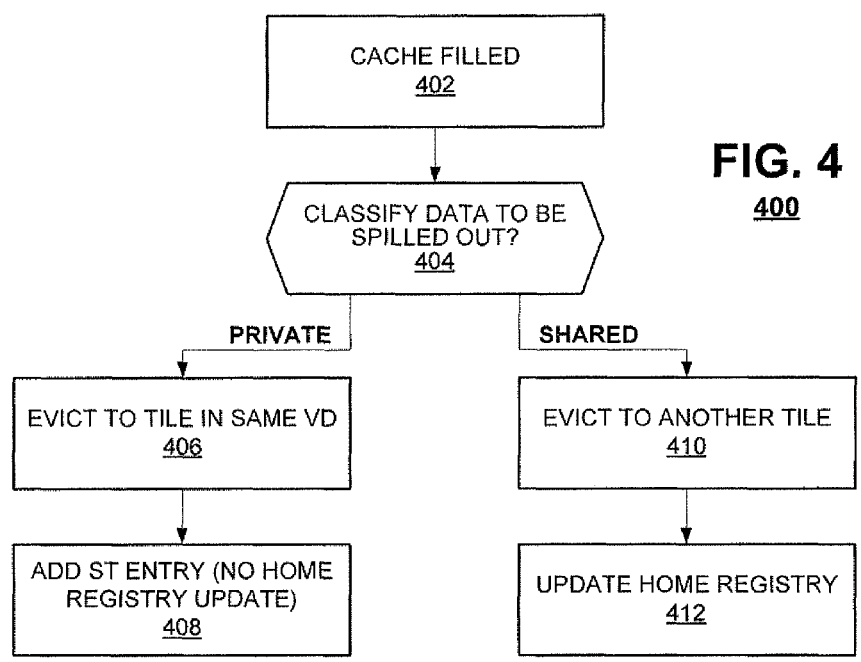
FIG. 3 illustrates an exemplary spill table entries according to an embodiment of the present invention.
FIG. 4 illustrates a simplified process flow of a data eviction process according to an embodiment of the present invention.

Each private cache may evict data to another cache located within the same VD, and the spill tables in each tile may include entries regarding the data evictions for that respective tile. Thus, each spill table may be distinct and particular to the tile (or cache) it is associated with. FIG. 3 illustrates exemplary spill table entries 300 according to an embodiment of the present invention. For example, the spill table entries 300 may be provided in spill table 211 of FIG. 2(b). The spill table entries 300 may include a data ID field 310 and a corresponding remote host address ID pointers 310. The data ID field 210 may identify the evicted data, and its corresponding remote host address pointer 310 may identify the tile (or private cache within the tile) within the VD where the evicted data may be stored. In the FIG. 3 example, Lines A and B may be evicted from tile 211 to tile 212; Line C may be evicted from tile 211 to tile 216; and Lines D-G may be evicted from tile 211 to tile 215. When a tile evicts private data to another private cache within its VD and updates its respective spill table, the tile may not report the eviction to the home registry 230.

Next, operations of the cache collaboration system with spill tables will be described. FIG. 4 illustrates a simplified flow diagram of an eviction process 400 according to an embodiment of the present invention. In step 402, the private cache (say, 211.1) may determine that it is filled and has reached maximum capacity. Hence, the private cache may remove data from its cache to make room. In an embodiment, the private cache may implement a last-in-first-out (LIFO) algorithm for removing data.

In step 404, the private cache may classify the data to be evicted (spilled out) as either private data or shared data. Private data may refer to data that will typically not get requested by other tiles. Shared data, on the other hand, may refer to data that will typically be shared by multiple tiles for example multi-threaded workloads such as Parsec, Splash, OLTP, SPECWeb, etc. The classification between private and shared data may be made based on the application generating or requesting the data. In an embodiment, the classification between private and shared data may be implemented according to the algorithm described in Seth H. Pugsley et al., "SWEL: Hardware Cache Coherence Protocols to Map Shared Data onto Shared Caches", *PACT '10*, Sep. 11-15, 2010, Vienna, Austria.

If the data is classified as private data, the data may be evicted to another tile, which has extra space, within the same VD in step 406. Also, an entry in the evictor (original) tile's spill table may be made to identify the data that was evicted and a corresponding remote host ID pointer to the data's new location in step 408. Moreover, the home registry 230 may not be notified of the eviction. Therefore, the home registry 230 may still indicate that the evicted data is located in the evictor (original) tile's cache.

If the data is classified as shared data in step 404, the data may evicted to another tile in step 410. In an embodiment, shared data may be evicted randomly to any tile with available cache space. The new remote host tile may be within the same VD or outside the original tile's VD. In step 412, the home registry may updated to reflect the new tile location of the evicted data.

Figure 5B:
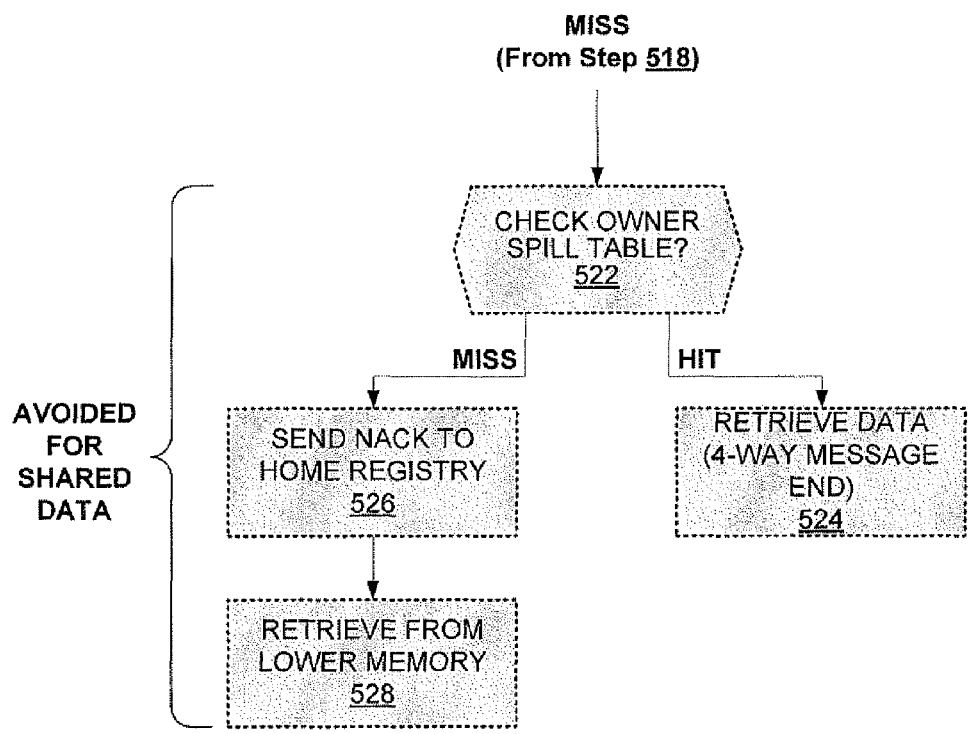

FIGS. 5(a) and 5(b) illustrate a simplified flow diagram of a data retrieval process 500 according to an embodiment of the present invention. In step 502, a tile may request a piece of data. The data may be requested by an application or part of an application being executed by the tile. In step 504, the tile may check its private cache for the requested data. If the requested data is present in the private cache (hit), the tile may retrieve the data from the private cache in step 506.

If, however, the requested data is not present in the private cache (miss), the tile may then check its private spill table in step 508. Entries in the spill table as described herein, may correspond to earlier evicted data from the tile to remote hosts within the same VD as the tile. If the requested data matches a data ID entry in the spill table (hit), the requesting tile may transmit a request for the data to the corresponding remote host address from the spill table entry in step 510. Hence, the data may be retrieved from the remote host. In this instance, previously evicted data may be readily retrieved from the data host without interfacing with the home registry. A significant percentage of private data may be retrieved in this manner—either in the tile's private cache or by checking the tile's spill table. As a result, evicted private data may be retrieved with a 2-message relay. The first message from the requesting tile to the remote host as indicated by the spill table to request the data. The second message from the remote host to the requesting tile with the requested data. Thus, cache collaboration with spill table(s) as described herein provide improved efficiency and reduce overhead expenses.

If, however, the requested data does not match a data ID entry in the spill table (miss), the home registry may then be checked for the requested data in step 514. If there is no match in the home registry (miss), the requested data may be retrieved from the lower memory in step 514. After retrieval, the data may then also be stored in the requestor tile's private cache, and the home registry may be updated with this information.

If there is a match in the home registry (hit), the request for the data may be forwarded to the tile listed as the owner in the home registry in step 516. When the request is received by the listed owner, the owner may check its private cache for the data in step 518. If the requested data is present in the listed owner's private cache (hit), the listed owner may forward the data to the requesting tile in step 520. Thus, at the end of step 520, the process may have retrieved the message in a 3-way message relay. A first message may be from the requesting tile to the home registry. A second message may be from home registry to the owner tile. And a third message may from the owner tile to requesting tile with the requested data. A significant percentage of shared data may be retrieved by steps 512-520.

Steps 522-528 in FIG. 5(b) are shown; however, the process 500 reaching these steps may be very rare if ever. If in step 518 the data is not present in the listed owner's private cache, the listed owner may then check its spill table for the requested data in step 522. If there is no match in the listed owner's spill table, a NACK message may be sent to the home registry and the data may be retrieved from the lower memory in steps 526, 528. If the requested data matches a data ID entry in the spill table (hit), the requesting tile may transmit a request for the data to the corresponding remote host address from the spill table entry in step 524. Consequently, the data may be retrieved from the remote host in a 4-way message relay. However, the 4-way message relay may be very rare if not impossible because of the classification of private and shared data (step 404 in FIG. 4). Most private data presently stored in a tile cache may be retrieved either from the requester's own private cache (step 506) or from a remote host as identified by its spill table (step 510 and 2-way message relay) in most cases. Most shared data presently stored in a tile cache may be retrieved either from the requester's own private cache (step 506) or from remote host as identified by the home registry (step 520 and 3-way message relay). Private and shared data not presently stored in a tile cache may be retrieved from the lower level memory (step 514). Therefore, the collaboration system with spill table(s) as described herein may offer improved efficiency and speed over conventional cache collaboration systems.

FIGS. 6-9 illustrate simulation results of embodiments of the collaboration system with spill table(s) as described herein compared to conventional cache collaboration systems. The simulations were executed on Simics Full-System simulation framework. The simulations show 30 co-schedules (mixes) and each co-schedule includes sixteen randomly-selected applications from the SpecCPU2006 benchmark suite. Furthermore, each co-schedule is statically divided into four virtual domains.

Figure 6:
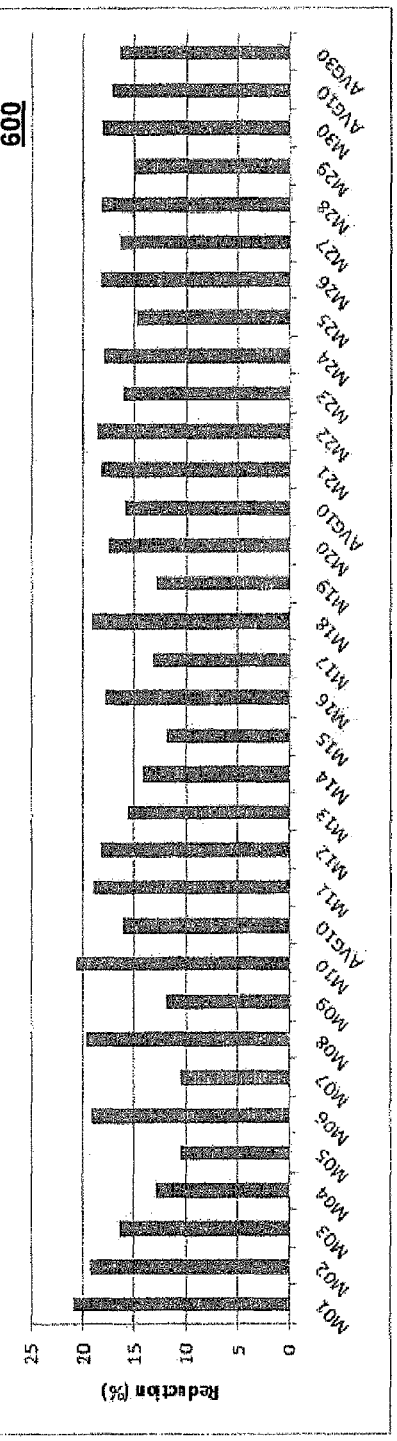
FIG. 6 illustrates simulation results according to an embodiment of the present invention.

FIG. 6 shows reduction in interconnect power for embodiments of the present invention as described herein compared to conventional systems. Based on the simulation results, the present invention embodiments may achieve significant power savings of up to 21% with an average of 15% savings.

Figure 7:
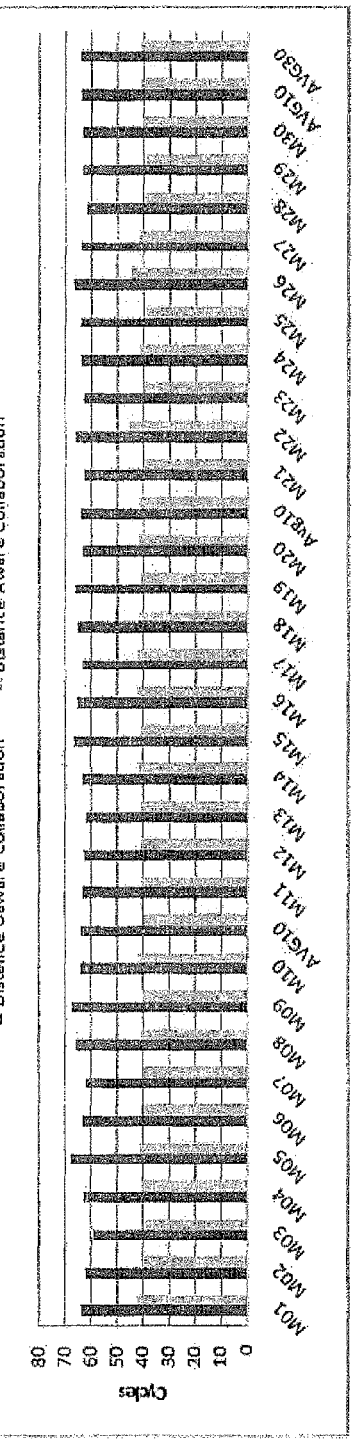
FIG. 7 illustrates simulation results according to an embodiment of the present invention.

FIG. 7 shows reduction in the average remote hit latency due to better distance locality as provided by the present invention embodiments. In the simulation, the average remote hit latency is reduced from 62 cycles in conventional systems to 40 cycles in the present invention embodiments. Thus, the simulation results illustrate that present invention embodiments effectively reduce the number of hops to traverse and, consequently, reduce network traffic and associated power consumption.

Figure 8:
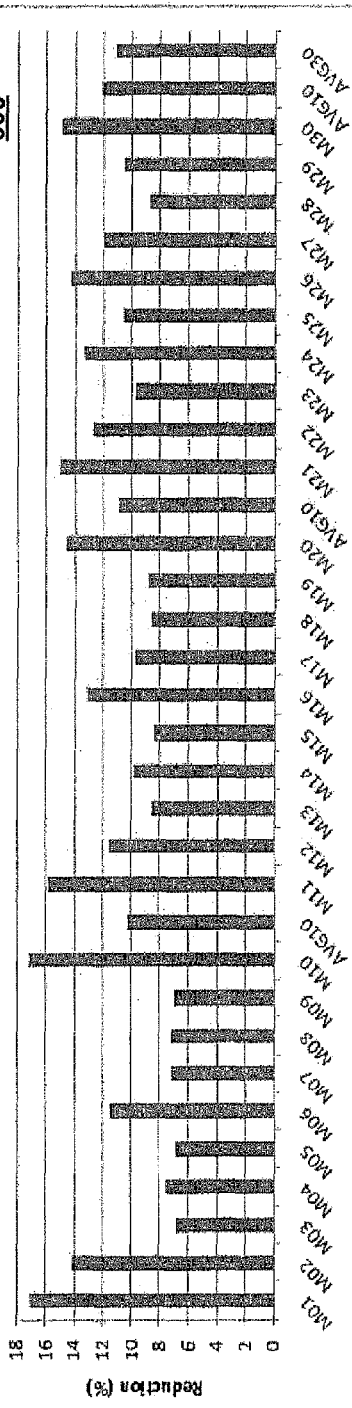
FIG. 8 illustrates simulation results according to an embodiment of the present invention.

FIG. 8 shows reduction in un-core power (MoC plus caches) for embodiments of the present invention as described herein compared to conventional systems. Based on the simulation results, the present invention embodiments may reduce power consumption up to 17% with an average of 11%. The large savings are due to the large proportion of interconnect power in total un-core power consumption.

Figure 9:
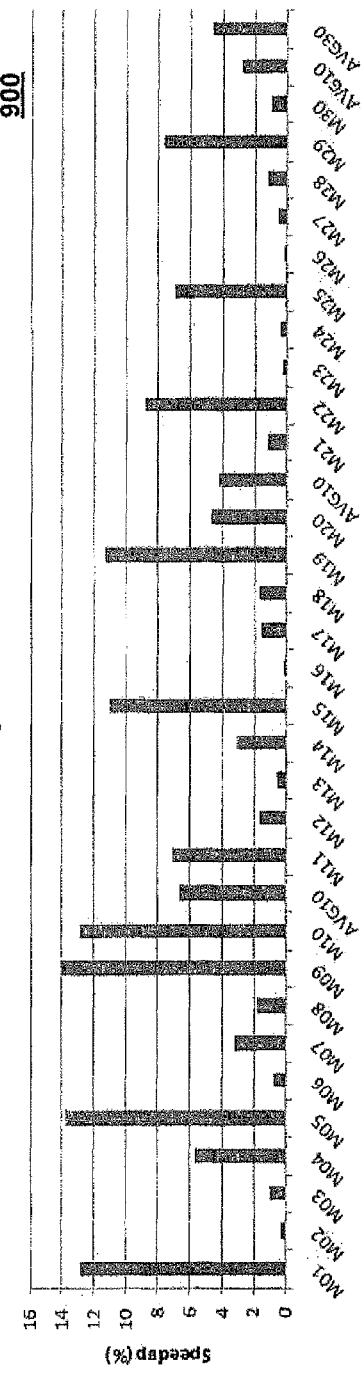
FIG. 9 illustrates simulation results according to an embodiment of the present invention.

FIG. 9 shows performance speedup for aggregate IPC (inter-process communication) due to better locality provided by embodiments of the present invention. Based on the simulation results, the speedup may increase up to 14% with an average of 4%.

Embodiments of the present invention may be implemented in a computer system. Embodiments of the present invention may also be implemented in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), a system on a chip, network computers (NetPC), set-top boxes, network hubs, wide area network (WAN) switches, or any other suitable system.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising, comprising:
    a plurality of tiles divided into multiple virtual domains, each tile comprising:
        a router to communicate with others of said tiles,
        a private cache to store data, and
        a spill table to record pointers for data evicted from the private cache to a remote host, wherein the remote host and the tile comprising the spill table are provided within the same virtual domain.

2. The system of claim 1, wherein the private cache is a private portion of a larger cache shared by at least two tiles.

3. The system of claim 1, wherein the private cache is a discrete cache.

4. The system of claim 1, wherein the spill table to record pointers for evicted private data but not evicted shared data.

5. The system of claim 1, wherein the computer system is a chip multi-processor.

6. The system of claim 1, wherein one tile of said tiles includes a home registry.

7. A method, comprising:
    based on classification of data in a private cache as private or shared data, performing a process including
    for private data,
        evicting the data to a remote host,
        adding an entry corresponding to the evicted data and the remote host in a spill table without alerting a home registry; and
    for shared data,
        evicting the data to a remote host and
        alerting the home registry.

8. The method of claim 7, wherein the private cache and the remote host for private data are provided in a common virtual domain.

9. A method, comprising:
    receiving a request for a piece of data;
    checking if a private cache contains the piece of data;
        if yes, retrieving the data from the private cache;
        if no, checking a spill table for the piece of data, wherein the spill table includes pointers for data evicted from the private cache;
            if found in the spill table, contacting a remote host identified in the spill table to request the piece of data; and
            if not found in the spill table, contacting a home registry, wherein the private cache and remote host are provided in a common virtual domain.

10. The method of claim 9, further comprises
    checking the home registry for the piece of data;
        if found in the home registry, the home registry contacting another remote host identified in the home registry and the another remote host forwarding the piece of data, and
        if not found in the home registry, retrieving the piece of data from a lower level memory.

11. The method of claim 9, wherein the piece of data identified in the spill table is retrieved in a 2-way message relay.

12. The method of claim 9, wherein the piece of data identified in the home registry is retrieved in a 3-way message relay.

13. A computer system, comprising:
    a processor;
    a lower level memory; and
    a plurality of tiles divided into multiple virtual domains, each tile including
        a router to communicate with others of said tiles,
        a private cache to store data, and
        a spill table to record pointers for data evicted from the private cache to a remote host, wherein the remote host and the tile comprising the spill table are provided within the same virtual domain.

14. The computer system of claim 13, wherein the private cache is a private portion of a larger cache shared by at least two tiles.

15. The computer system of claim 13, wherein the private cache is a discrete cache.

16. The computer system of claim 13, wherein the spill table to record pointers for evicted private data but not evicted shared data.

17. The computer system of claim 13, wherein the computer system is a chip multi-processor.

18. The computer system of claim 13, wherein one tile of said tiles includes a home registry.

* * * * *